United States Patent [19]

Maruyama et al.

[11] 4,360,127

[45] Nov. 23, 1982

[54] APPARATUS FOR SUPPLYING FLUID OF PREDETERMINED QUANTITY

[75] Inventors: Eisuke Maruyama, Kawasaki; Hiromitsu Kobayashi, Yokohama; Masakazu Mitsuhashi, Kawasaki; Hiromichi Takeuchi, Yokohama; Yoshiki Futamura, Funabashi; Naohito Suzuki, Kawasaki, all of Japan

[73] Assignees: Tokico Ltd., Kanagawa; Tokico Yuki Ltd., Tokyo, both of Japan

[21] Appl. No.: 198,244

[22] Filed: Oct. 17, 1980

[30] Foreign Application Priority Data

Oct. 19, 1979 [JP] Japan .................. 54-135028

[51] Int. Cl.³ .............................. B67D 5/30
[52] U.S. Cl. ...................... 222/14; 222/59; 222/71; 141/214; 141/225
[58] Field of Search ............ 222/14, 15, 16, 22, 222/53, 59, 71, 73, 529; 141/214, 225; 137/630.15

[56] References Cited

U.S. PATENT DOCUMENTS

| 3,251,507 | 5/1966 | Murray | 222/14 |
| 3,586,073 | 6/1971 | Vest et al. | 141/214 X |
| 3,638,689 | 2/1972 | Eklund | 141/225 X |
| 3,773,219 | 11/1973 | Irie | 222/14 X |
| 3,823,752 | 7/1974 | Lasater et al. | 141/225 X |
| 4,139,032 | 2/1979 | Taylor et al. | 141/225 X |

FOREIGN PATENT DOCUMENTS 1098880  1/1968  United Kingdom ............... 141/214

Primary Examiner—Allen N. Knowles
Attorney, Agent, or Firm—Michael N. Meller; Anthony H. Handal

[57] ABSTRACT

An apparatus for supplying fluid of predetermined quantity comprises a supplying passage for supplying fluid, an opening and closing valve provided within the supplying passage, mechanism for opening the opening and closing valve, locking mechanism for locking the opening and closing valve in an open state, negative pressure generating mechanism for generating negative pressure upon supply of the fluid outside through the supplying passage, lock releasing mechanism for releasing the lock of the locking mechanism by the introduction of the negative pressure generated by the negative pressure generating mechanism atmosphere introducing mechanism for introducing atmosphere into the lock releasing mechanism to neutralize the negative pressure, solenoid valve for interrupting the atmosphere introduction by the atmosphere introducing mechanism, measuring device for measuring the flow rate of the fluid supplied through the supplying passage, and control signal transmitting device for transmitting and supplying the control signal to the solenoid valve when the measured flow rate of the fluid reaches a predetermined flow srate. The solenoid valve interrupts the atmosphere introduction by the atmosphere introducing mechanism according to the control signal. The lock releasing mechanism closes the opening and closing valve and releases the lock of the locking mechanism by the negative pressure upon interruption of the atmosphere introduction.

6 Claims, 8 Drawing Figures

APPARATUS FOR SUPPLYING FLUID OF PREDETERMINED QUANTITY

BACKGROUND OF THE INVENTION

This invention relates generally to apparatus for supplying fluid of predetermined quantity, and more particularly to an apparatus for supplying fluid of predetermined quantity which uses a solenoid valve and the negative pressure generated upon supply of the fluid, capable of automatically stopping the fluid supply by small electrical power consumption.

In most conventional fuel supplying or dispensing apparatus, for example, the supply of fuel is started by pulling on the nozzle lever after the fuel supplying nozzle is inserted inside the fuel intake opening of the vehicle, and the supply of fuel is stopped by releasing the nozzle lever when the supply of fuel reaches a predetermined quantity. As opposed to this, a fuel supplying apparatus has been proposed in which a solenoid valve is provided directly on the fluid supply passage inside the fuel supplying nozzle, to automatically stop the supply of fuel by closing the solenoid valve by the control signal applied from the apparatus for supplying fluid of predetermined quantity when the supply of fuel reaches a predetermined quantity.

However, the above fuel supplying apparatus having automatic fuel supply stopping function, must all open or close the solenoid valve against the fluid pressure or the spring force and the like, and require a large current to operate the solenoid valve, thus being disadvantageous in that the electrical power consumption of the apparatus is large and uneconomical.

SUMMARY OF THE INVENTION

Accordingly, a general object of the present invention is to provide a novel and useful apparatus for supplying fluid of predetermined quantity which solves the above described problems.

Another and more specific object of the invention is to provide an apparatus for supplying fluid of predetermined quantity in which a diaphragm membrane which undergoes displacement by the negative pressure generated upon supply of the fluid, is provided, and the solenoid valve is closed when the supplying quantity reaches a predetermined quantity and a force due to the negative pressure is put on the diaphragm membrane, to automatically close the valve. According to the apparatus of the present invention, as compared to an apparatus provided with an opening and closing solenoid valve directly inside the supplying pipe, the apparatus of the present invention uses negative pressure, and thus is capable of opening and closing and controlling the solenoid valve by small electrical current. Furthermore, by employing a type of solenoid valve which opens upon being supplied with current, the apparatus has a high safety factor, since, for example, upon a power failure accident, the solenoid valve is closed immediately and the fluid supply of predetermined quantity is stopped automatically.

Still another object of the invention is to provide an apparatus for supplying fluid of predetermined quantity, capable of automatically closing the valve for supplying fluid of predetermined quantity upon supply of fuel to the full capacity of the tank, by opening an end part of the atmosphere introducing tube of the inserting part of the supplying pipe inside the tank, upon, for example, supplying of fuel inside the tank. According to the apparatus of the invention, even when the tank becomes full before the expected quantity, for example, the supply of fuel can be stopped automatically.

Other objects and further features of the present invention will be apparent from the following detailed description with respect to preferred embodiments of the invention when read in conjunction with the accompanying drawings.

DETAILED DESCRIPTION

Figure 1:
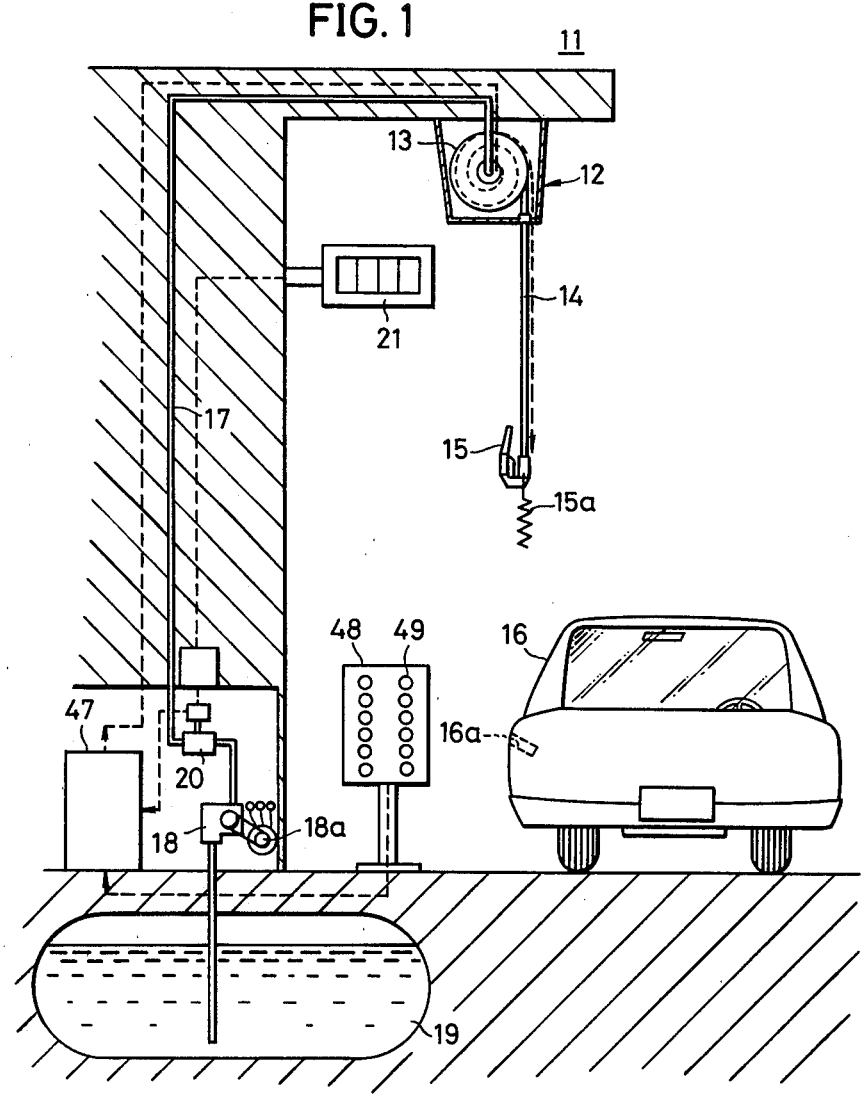
FIG. 1 is a view showing a general construction of an embodiment of a suspending type fuel supplying apparatus applied with an apparaus for supplying fluid of predetermined quantity of the present invention.

In FIG. 1, a fuel supplying apparatus 11 comprises a delivery unit 12 attached to the roof of the fuel supplying station, and constructed so that a fuel supplying hose 14 is rolled around a hose reel 13 inside the delivery unit 12. A fuel supplying nozzle 15 provided at the end part of the hose 14 is inserted inside a fuel intake opening 16a of the vehicle to supply the fuel. The fuel supplying hose 14 inside the delivery unit 12 is connected to a fuel supplying pump 18 through a fixed pipe arrangement 17. The fuel pumped up from an underground tank 19 by the pump 18 is supplied to the delivery unit 12 through the fixed pipe arrangement 17 after passing through a flowmeter 20, and supplied to the nozzle 15 through the hose 14. The flow quantity of the fuel supplied through the nozzle 15 is measured by the flowmeter 20, and displayed by a supplied fuel quantity displaying device 21 provided at a position easily seen near the roof part of the fuel supplying station.

Figure 2:
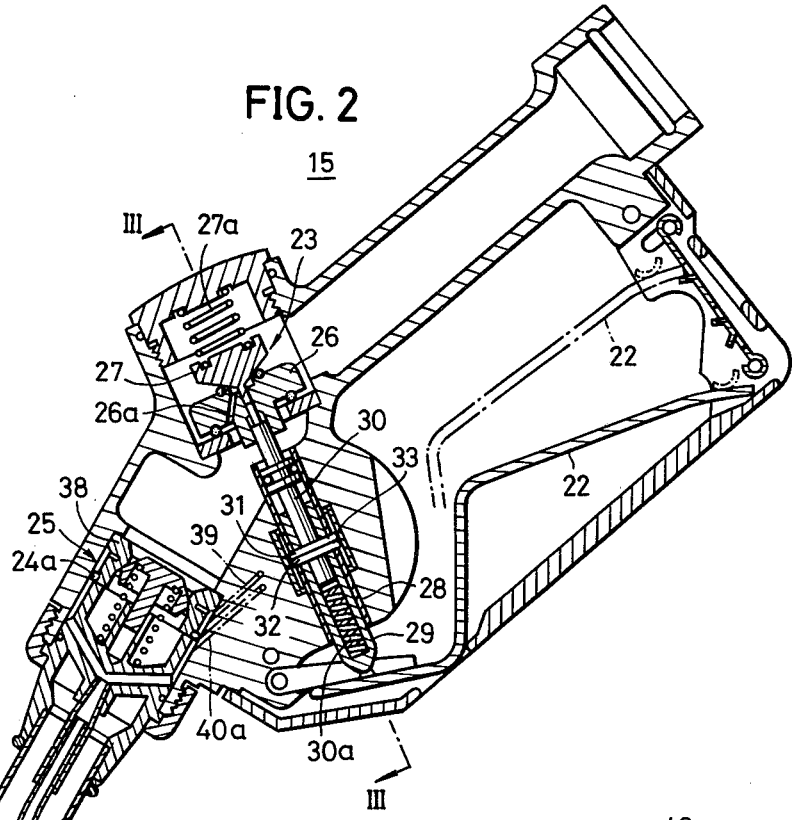
FIG. 2 is a cross-sectional view of an embodiment of a fuel supplying nozzle of the apparatus of FIG. 1.

A valve 23 for supplying fuel of predetermined quantity and an automatic valve 25 opened and closed by the operation of a nozzle lever 22 and closed by a control signal, are provided inside a casing of the fuel supplying nozzle 15 as shown in FIG. 2. The valve 23 comprises a pair of main and sub valve bodies 26 and 27, and both valve bodies 26 and 27 are urged in the valve closing direction by a spring 27a. The displacing movement of the nozzle lever 22 is transmitted to the valve bodies 26 and 27, by a shaft 29 and a valve shaft 30 at a bottom comprising intermediate space, inserted freely slidable inside a sleeve 28. The valve shaft 30 has its bottom part inserted freely slidable inside the shaft 29, and a compressed spring 30a is provided under pressure between the bottom edge part of the valve shaft 30 and the bottom part of the shaft 29. In a state shown in FIGS. 2 and 3, two rollers 31 and 32 used as locking parts, are engaged to the valve shaft 30, and thus the valve shaft 30 and the shaft 29 undergo displacement unitarily.

Figure 3:
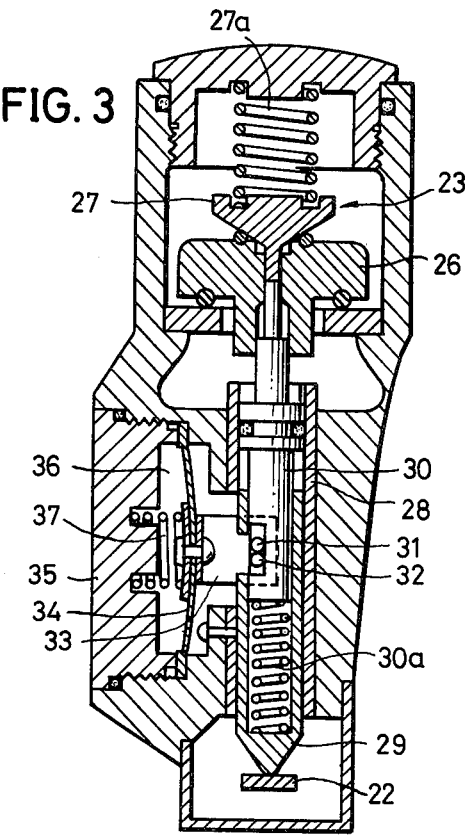
FIG. 3 is a cross-sectional view of the fuel supplying nozzle of FIG. 2 taken along lines III—III.

The rollers 31 and 32 are respectively supported of their ends by a receiving plate 33, and is freely movable in the moving direction of the shaft 29. The receiving plate 33 is fixed to a diaphragm membrane 34 as shown in FIG. 3, and a diaphragm chamber 36 is partitioned by the diaphragm membrane 34 and a lid 35 provided outside the diaphragm membrane 34. A compressed spring 37 is provided under pressure inside the diaphragm chamber 36, and thus the rollers 31 and 32 are urged in an engaging direction with the valve shaft 30. When the engagement of the valve shaft 30 with the rollers 31 and 32 is disengaged, the valve shaft 30 becomes movable, separately with respect to the shaft 29. Regarding an example of the lock mechanism of the valve shaft 30, it is described in detail in the U.S. Pat. No. 3,638,689, for example.

One end of a negative pressure pipe 38 is opened at the internal periphery of a valve seat 38 of the automatic valve 25, and the valve seat itself becomes a Venturi tube part upon opening of the automatic valve 25, thus the air inside the negative pressure pipe 39 is drawn out under suction into the valve seat 38. The other end of the negative pressure pipe 39 is opened inside the diaphragm chamber 36. Furthermore, an atmosphere introducing tube 40 is provided inside an ejection pipe 24 of the fuel supplying nozzle 15, and one end of the atmosphere introducing tube 40 is opened as an atmosphere introducing opening at the front edge sidewall part of the ejection pipe 24. On the other hand, the other end of the atmosphere introducing tube 40 is connected to the diaphragm chamber 36 through a solenoid valve 41 provided between tubes 40a inside the fuel supplying nozzle 15.

Figure 4:
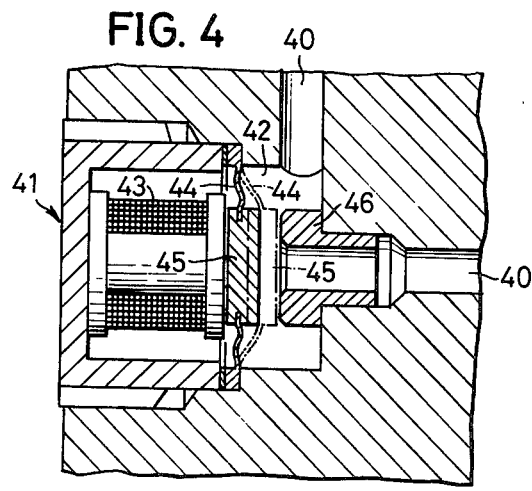
FIG. 4 is an enlarged cross-sectional view of an embodiment of a solenoid valve part of the fuel supplying nozzle of FIG. 2.

As shown in FIG. 4, the solenoid valve 41 is screwed fixedly inside a space 42 formed half way between the atmosphere introducing tube 40. A solenoid 43 is partitioned from the space 42 by a diaphragm membrane 44, and a valve body 45 comprising a magnetic body fixed at the center part of the diaphragm membrane 44 separates from or makes contact with a valve seat 46, according to the magnetization or demagnetization state of the solenoid 43. The solenoid 43 is not actuating upon non-supplying of the fuel, and the valve body 45 makes contact with the valve seat 46 due to the elasticity of the diaphram membrane 44 and the magnetic repellent force exerted by the solenoid 43. The solenoid valve 41 is then closed.

When the solenoid 43 is actuating and magnetized upon supplying of fuel, the valve body 45 is separated from the valve seat 46 by the magnetic attraction force of the solenoid 43 exerted against the elasticity of the diaphragm membrane 44.

In this embodiment of the present invention, the solenoid valve 41 is provided inside the atmosphere introducing tube 40, and an O-ring 24a is provided at the connection part between the ejection pipe 24 and the fuel supplying nozzle 15, thus preventing the short connection between the negative pressure tube 39 and the atmosphere introducing tube 40 by this O-ring 24a. In addition, when it is possible to provide the solenoid valve 41 in the up-stream side of the above O-ring 24a, this O-ring can be eliminated.

The opening and closing control of the solenoid valve 41 is, in this embodiment, performed by the signal emitted from a control part 47 for controlling the supply of fluid of predetermined quantity provided inside the fuel supplying station structure. This control part 47 is determined of its expected fuel supply quantity by a preset device 48 for presetting the predetermined quantity of fluid to be supplied, and generates a control signal when the supplied fuel quantity coincides with the predetermined fuel supply quantity. The preset device 48 is positioned outside near the fuel supply servicing area, and comprises a plurality of push buttons showing the corresponding fuel supply quantity on the front panel.

First, the operation for supplying fuel to fill the tank full without the use of the preset device 48, will not be described.

Upon non-supplying of fuel, the fuel supplying nozzle 15 is positioned at the fuel supply waiting position so as not to be in the way of a vehicle 16, and by pulling on a suspended string 15a suspended from the fuel supplying nozzle 15, the fuel supplying nozzle 15 can be lowered to the fuel supplying position by rotating the hose reel 13. Upon pulling of the suspended string 15a, a fuel supplying pump driving motor 18a is started, and the fuel supplying pump 18 is driven.

The ejection pipe 24 of the fuel supplying nozzle 15 is inserted into the fuel intake opening 16a of the vehicle 16. This insertion of the ejection pipe 34 is detected atuomaticaly, and a start signal respective of the fuel supplying start operation is supplied to the control part 47, thus the solenoid valve 41 actuates and opens due to this signal from the control part 47. The insertion of the ejection pipe 24 can easily be detected by use of a known mechanical detection means, or optical detection means and the like. In this embodiment of the invention, it is organized so that the start signal is emitted as output upon the insertion of the ejection pipe 24, but it can be organized, for example, so that the start signal is provided as output when the suspended string 15a is pulled. Furthermore, when the fuel supplying apparatus is a ground type apparatus, as will be described later on, it can be organized so that the start signal is emitted as output when the fuel supplying nozzle is unhooked from the nozzle hanger.

When the ejection pipe 24 is inserted into the fuel intake opening 16a, the nozzle lever 22 is pulled up to the valve opening position shown by the dotted lines of FIG. 2, and held in that locked position. Upon pulling up of the nozzle lever 22, the shaft 29 pushes the valve shaft 30 in the upward direction, and thus the sub valve body 27 separates from the main valve body 26 in the upward direction. Hence, a flow passage 26a formed at the main valve body 26 opens, and the fuel fluid flows out onto the automatic valve 25 side through the flow passage 26a. When the nozzle lever 22 is pulled up even further, the valve shaft 30 pushes the main valve body 26 in the upward direction, and thus the valve 23 is fully opened. Since the front and rear of the main valve body 26 are respectively communicated by a flow passage 26a before the main valve body 26 opens, the main valve body 26 can be opened by a small force.

The fuel which has passed through the valve 23 passes through the automatic valve 25, and is supplied inside the fuel intake opening 16a from the ejection pipe 24.

By the Venturi effect introduced upon the passing of the fuel through the automatic valve 25, the air inside the negative pressure pipe 39 is drawn out by suction into the automatic valve 25.

Therefore, at the early stage of the starting of the fuel supply, one end of the atmosphere introducing tube 40 is open to the atmosphere not being interrupted by the fluid surface, and the amount of air drawn out from within the diaphragm chamber 36 by the negative pressure pipe 39 is replenished by the atmosphere introducing tube 40. For this reason, it never becomes of negative pressure inside the diaphragm chamber 36, and the diaphragm membrane 34 does not undergo displacement. Accordingly, the rollers 31 and 32 are engaged to the valve shaft 30, fixing the valve shaft 30 in a immovable state with respect to the shaft 29, and hence the valve shaft 30 is locked in an open position.

When the fuel supply tank (not shown) of the vehicle 16 becomes full as the supplying of fuel progresses, the open part of the atmosphere introudcing tube 40 of the ejection pipe 24 is interrupted by the fluid surface inside the fuel intake opening 16a. On the other hand, the air is continuously drawn out by suction by the negative pressure pipe 39, and thus it instantly becomes of negative pressure inside the diaphragm chamber 36, and hence the diaphragm membrane 34 undergoes displacement to the left-hand side direction in FIG. 3 against the compressed spring 37. As a result, the rollers 31 and 32 separate from the valve shaft 30 together with the displacement of the receiving plate 33, and hence the valve shaft 30 is moved downwards against the compressed spring 30a by the fluid pressure and the resilient restitution of the spring 27a exerted on the main valve body 26 and the sub valve body 27. Accordingly the valve 23 closes, and the supply of fluid is stopped atuomatically.

The operator then pulls the fuel supplying nozzle 15 from within the fuel intake opening 16a, and releases the nozzle lever 22 from its locked position to the valve closing position. Hence, the shaft 29 is pushed downwards by the compressed spring 30a, and the rollers 31 and 32 engages again with the valve shaft 30.

Upon supplying fuel to fill the tank full, the supplying of fuel is automatically stopped by the operation of the automatic valve closing mechanism when the atmosphere introducing opening of the atmosphere introducing tube 40 is interrupted by the fuel.

Next, the operation upon establishing of the fuel supply of predetermined quantity by the use of the preset device 48 will now be described.

First, before performing the fuel supplying operation, a push button key 49 of the preset device 48 which shows the desired fuel supplying quantity is pushed, to establish the desired fuel supplying quantity in the control part 47. This fuel supplying quantity is transmitted to the control part 47 and memorized therein. When the establishing of the fuel supplying quantity by the preset device 48 is completed, the fuel supplying nozzle 15 is inserted inside the fuel intake opening 16a of the vehicle 16, and the supply of fuel is started by pulling the nozzle lever 22. By the insertion of the fuel supplying nozzle 15, the solenoid valve actuates and opens as described above. Accordingly, the pressure inside the diaphragm chamber 36 does not become of negative pressure upon starting of the fuel supply by pulling the nozzle lever 22, and thus introduces no inconveniences.

In this embodiment of the invention, it is organized so that the solenoid valve actuates and opens by the insertion of the fuel supplying nozzle 15, and therefore, when the nozzle lever 22 is pulled by mistake before the fuel supplying nozzle 15 is inserted inside the fuel intake opening 16a, the valve 23 is closed instantly by the operation of the automatic valve closing mechanism, hence preventing an accident in which the fuel is sprayed around.

When the fuel supplying quantity reaches the predetermined fuel supplying quantity as the fuel supplying procedure progresses, the solenoid valve 41 is cut off from its actuating state by the signal from the control part 47, and the solenoid valve 41 is closed. As a result, the negative pressure pipe 39 which was until that point opened to the atmosphere by the atmosphere introducing tube 40 is then cut off its communication, and the diaphragm chamber 36 becomes of negative pressure within. Hence, the diaphragm chamber 36 becomes of identical state as when the open part of the atmosphere introducing tube 40 is closed upon filling the tank full by the supply of fuel as described above, and the valve 23 closes automatically along with the displacement of the diaphragm membrane 34 due to the negative pressure.

Upon designation of the fuel quantity to be supplied described above, the solenoid valve 41 closes simultaneously as when the supply reaches the predetermined fuel supplying quantity, the diaphragm membrane 34 is drawn inwards by suction by the negative pressure, and the supply of fuel is stopped automtically. This displacement of the diaphragm membrane 34 is a mechanical displacement which uses the negative pressure, not requiring a large current to open and close valve 41, and thus the electrical power consumption due to the solenoid valve 41 is quite small.

Even upon a power failure accident during the supplying of fuel in which the control part 47 becomes inoperable, the valve 23 is automatically closed simultaneously as the power failure occurs since the solenoid valve 41 is cut off from its actuating state, and inconveniences such as the continuation of the supplying of fuel in the non-controlled state.

In the above embodiment of the invention, besides the construction of the solenoid valve shown in FIG. 4, for example, the valve seat 46 can be formed from a magnetic material, and by fixing a magnet onto the valve body 45, the valve body 45 can constantly be positioned on the valve seat 46 by the magnetic force of the magnet, and organized so that upon starting of the supply of fuel, the valve body 45 is separated from the valve seat 46 by a magnetic force greater than the magnetic force generated when the solenoid 43 is supplied with current.

Figure 5:
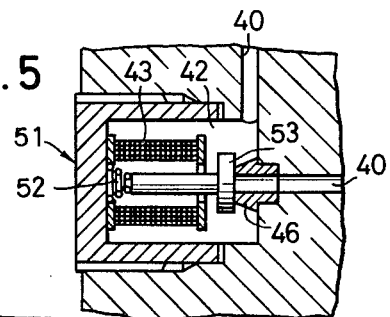
FIG. 5 is a cross-sectional view of a modification of the solenoid valve part shown in FIG. 4.
Figure 6:
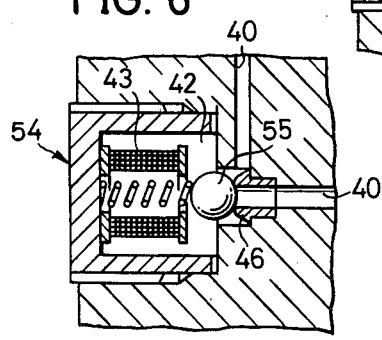
FIG. 6 is a cross-sectional view of another modification of the solenoid valve part shown in FIG. 4.

The solenoid valve can also be constructed as a solenoid valve 51 shown in FIG. 5, in which a spring 52 urges a valve body 53. In addition, the solenoid valve can use a spherical shape valve body 55 shown in a solenoid valve 54 of FIG. 6 instead of the flat plate valve body.

Figure 7:
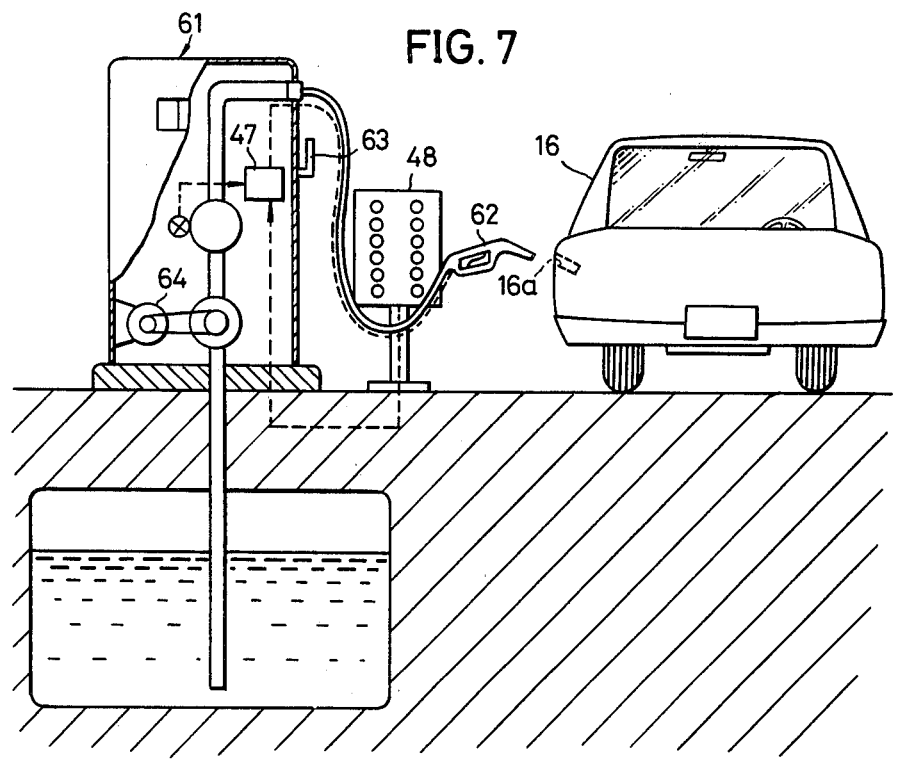
FIG. 7 is a view showing a general construction of an embodiment of a ground type fuel supplying apparatus applied with an apparatus for supplying fluid of predetermined quantity of the present invention.

Furthermore, in the above embodiment of the invention, the suspending type fuel supplying apparatus was used as an example of the fuel supplying apparatus, but the invention can also be applied to a ground type fuel supplying apparatus 61 shown in FIG. 7. In this embodiment of the invention, when a fuel supplying nozzle 62 is unhooked from a nozzle hanger 63 provided at the side of the fuel supplying apparatus 61, the apparatus is set in an operational state by starting of a fuel supplying pump driving motor 64.

In the above embodiment, the automatic valve closing mechanism is constructed so that by respectively displacing the valve shaft 30 with respect to the shaft 29, the nozzle lever 22 closes the valve 23 although the nozzle lever 22 is in a valve opening position. However, for example, a fuel supplying nozzle which is capable of moving the fulcrum of the nozzle lever 22 can be used, and an automatic valve closing mechanism provided at the fulcrum part of the nozzle lever 22, to move the fulcrum of the nozzle lever 22 to the position which closes the valve 23 by the operation of the automatic valve closing mechanism, holding the rear end part of the nozzle lever 22 at the valve opening position.

Figure 8:
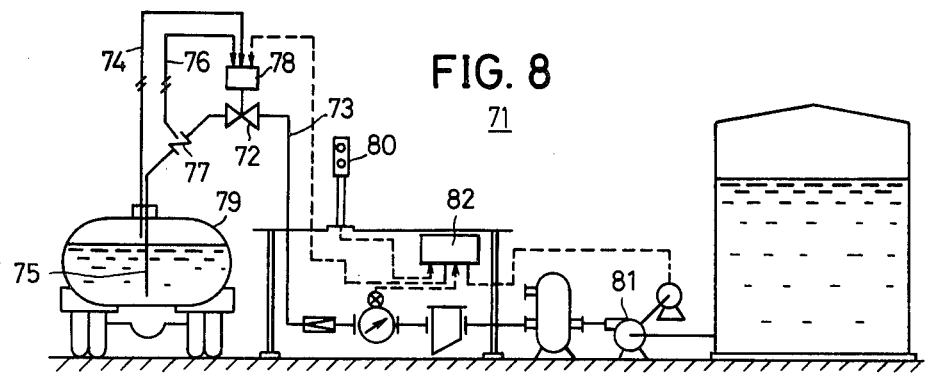
FIG. 8 is a view showing an approximate construction of an embodiment of a loading apparatus for supplying fluid of predetermined quantity applied with the apparatus for supplying fluid of predetermined quantity of the present invention.

In addition, in the above embodiment of the invention, a fuel supplying apparatus used in a fuel supplying station and the like was taken as an example of an apparatus for supplying fluid of predetermined quantity, but the invention can also be applied, for example, to a loading apparatus 71 for supplying fluid of predetermined quantity of a tank truck and the like, as shown in FIG. 8. In this embodiment of the invention, a valve 72 for supplying fluid of predetermined quantity is provided half way between a fuel supplying tube 73, and an atmosphere introducing tube 74 is open to the sidewall part of a drop pipe 75 attached to the front end part of the fuel supplying tube 73. A negative pressure pipe 76 has its one end open to a check valve 77 provided inside the fuel supplying tube 73, and the other end is connected to an automatic valve closing mechanism 78 attached to the valve 72.

Upon starting of the fuel supply, if the drop pipe 75 is inserted inside the hatch of the tank truck 79, the solenoid valve inside the automatic valve closing mechanism 78 opens. Next, when a fuel supply start button 80 is pushed, a fuel supplying pump 81 is driven, and the supply of fuel fluid is started.

When the supply of fuel reaches a predetermined quantity, the solenoid valve closes and the automatic valve closing mechanism 78 is operated by the control signal supplied from a control part 82 for controlling the supply of fluid of predetermined quantity, and the valve 72 is closed to complete the supply of fuel of predetermined quantity.

In this embodiment of the invention, upon filling of the tank of the tank truck 79 full with the supply of fuel, as in the other embodiments above, the valve 72 closes automatically when the open part of the atmosphere introducing tube 74 is interrupted by the fluid surface of the fuel inside the hatch.

Further, this invention is not limited to these embodiments. Variations and modifications may be made without departing from the scope of the invention.

What is claimed is:
1. An apparatus for supplying fluid of predetermined quantity, said apparatus comprising:
   a supplying passage for supplying fluid;
   an opening and closing valve provided within said supplying passage;
   means for opening said opening and closing valve;
   locking means for locking said opening and closing valve in an open state;
   negative pressure generating means for generating negative pressure upon supply of said fluid outside through said supplying passage;
   lock releasing means for releasing the lock of said locking means by the introduction of said negative pressure generated by said negative pressure generating means;
   atmosphere introducing means for introducing atmosphere into said lock releasing means to neutralize said negative pressure;
   solenoid valve means for interrupting said atmosphere introduction by said atmosphere introducing means;
   measuring means for measuring the flow rate of said fluid supplied through said supplying passage; and
   control signal transmitting means for transmitting and supplying said control signal to said solenoid valve means when said measured flow rate of said fluid reaches a predetermined flow rate,
   said solenoid valve means interrupting said atmosphere introduction by said atmosphere introducing means according to said control signal,
   said lock releasing means closing said opening and closing valve and releasing said lock of said locking means by said negative pressure upon interruption of said atmosphere introduction.

2. An apparatus as described in claim 1 in which said locking means comprises a valve shaft which unitarily undergoes displacement with said opening and closing valve, and a locking part which locks said opening and closing valve in an open position, and said lock releasing means comprises a diaphragm chamber which is communicated to said negative pressure generating means and said atmosphere introducing means and introduced respectively by said negative pressure and atmosphere, a diaphragm membrane which partitions said diaphragm chamber, and a displacing part which unitarily displaces said locking part with said diaphragm membrane, said diaphragm membrane and said displacing part undergoing displacement to release the lock against said valve shaft by said locking means when the pressure inside said diaphragm chamber becomes of negative pressure.

3. An apparatus as described in claim 1 in which said atmosphere introducing means comprises an atmosphre introducing passage communicated to said lock releasing means, and said solenoid valve means is provided in said atmosphere introducing passage to open or close the passage of said atmosphere introducing passage, said solenoid valve means opening the passage of said atmosphere introducing passage upon start of said fluid supply and closing the passage of said atmosphere introducing passage when supplied with said control signal.

4. An apparatus as described in claim 1 in which said solenoid valve means comprises a valve body which opens and closes said atmosphere introducing passage, an urging means for constantly urging said valve body to close the passage of said atmosphere introducing passage, and a solenoid which is applied with current and displaces said valve body against said urging means to open the passage of said atmosphere introducing passage upon start of said fluid supply, said solenoid being cut off its applying of current according to said control signal, said valve body displaced by said urging means due to the cut off applying of the current of said solenoid to close the passage of said atmosphere introducing passage.

5. An apparatus as described in claim 1 in which said control signal transmitting means further comprises preset means for presetting quantity of said supplying fluid at a predetermined valve arbitrarily.

6. An apparatus as described in claim 1 which further comprises a nozzle casing which accomodates said supplying passage, opening and closing valve, locking means, negative pressure generating means, lock releasing means, atmosphere introducing means, and solenoid valve means therein, and nozzle means which comprises a nozzle tube which constructs the foremost end of said supplying passage.

* * * * *